United States Patent [19]

Kawakami et al.

[11] Patent Number: 5,401,782

[45] Date of Patent: Mar. 28, 1995

[54] CATIONIC PIGMENT GRINDING RESIN FOR ELECTRODEPOSITION PAINT AND PRODUCTION THEREOF

[75] Inventors: Ichiro Kawakami; Hiroyuki Kageyama; Hiroyuki Nojiri, all of Neyagawa, Japan

[73] Assignee: Nippon Paint Co., Ltd., Osaka, Japan

[21] Appl. No.: 136,372

[22] Filed: Oct. 15, 1993

[30] Foreign Application Priority Data

Oct. 19, 1992 [JP] Japan .................................. 4-279764

[51] Int. Cl.⁶ ........................ C08K 3/20; C08L 63/02; C09D 5/44
[52] U.S. Cl. ................................ 523/415; 204/181.4; 204/181.7
[58] Field of Search ..................... 523/415; 204/181.4, 204/181.7

[56] References Cited

FOREIGN PATENT DOCUMENTS 1449839 9/1976 United Kingdom .

*Primary Examiner*—Melvyn I. Marquis
*Assistant Examiner*—D. Aylward
*Attorney, Agent, or Firm*—Wenderoth, Lind & Ponack

[57] ABSTRACT

Disclosed is a cationic resin which can produce a pigment paste having high dispersion stability, an electrodeposition paint with good storage stability and a coated film with preferred corrosion resistance. The cationic pigment grinding resin for electrodeposition paint obtained by reacting a) a hydrophobic epoxy resin obtained by reaction of a bisphenol A type epoxy resin with a half-blocked isocyanate; with b) sulfide; which contains a group having specific chemical formula in one molecule, in which said bisphenol A type epoxy resin has an epoxy equivalent of 180 to 1,000, said hydrophobic epoxy resin has a solubility parameter of 10.0 to 11.0 and a conversion rate to tertiary sulfonium is 70 to 90%.

14 Claims, No Drawings

CATIONIC PIGMENT GRINDING RESIN FOR ELECTRODEPOSITION PAINT AND PRODUCTION THEREOF

FIELD OF THE INVENTION

The present invention relates to the cationic resin suitable for a pigment grinding resin for electrodeposition paint.

BACKGROUND OF THE INVENTION

Electrodeposition coating is a method wherein aqueous paint is filled in a tank and paint components are electrophoretically moved and deposited onto a surface of an object to be coated present in the tank. The main application of this electrodeposition coating is anti-corrosion coating of car bodies and it is industrially important.

In general, an electrodeposition paint contains a pigment and a pigment grinding agent. In order to introduce a pigment into paint, a pigment paste obtained by grinding the pigment in an aqueous medium at a high concentration is used as an intermediate composition. To the pigment paste, a dispersing agent is formulated to give sufficient dispersion stability to the pigment paste. The dispersing agent is demanded to have the characteristic to increase dispersion stability of the pigment paste as well as performances to keep the paint stable for a prolonged period when the pigment paste is made into an electrodeposition paint by diluting it with an aqueous medium. In recent years, cationic resin is generally used for the pigment grinding agent of electrodeposition paint.

For instance, Japanese Kokai Publication Sho 63(1988)-23919 discloses a cationic resin which is obtained by addition of an alkylphenol and sulfide to an epoxy resin. However, since this resin has too strong hydrophilic property, the pigment paste using the resin has poor dispersion stability.

Japanese Kokai Publication Sho 53(1978)-47143 and Sho 56(1981)-2089 discloses a cationic resin which is prepared by reacting an epoxy resin with a half-blocked isocyanate and the reacting the obtained hydrophobic epoxy resin with an amine, phosphine or sulfide to give water solubility. The cationic resin described therein respectively contains ammonium salt groups, phosphonium salt groups or sulfonium salt groups.

However, since quaternary ammonium salt has a high base strength, it is impossible to obtain a coating having sufficient corrosion resistance even when the resin having the ammonium salt is used. Besides, the resin having the tertiary sulfonium salt has a low reactivity with sulfide and water solubility is insufficient and therefore, the electrodeposition paint using the resin has poor stability. The resin having phosphonium salt neither provides an electrodeposition paint of good stability because of insufficient hydrophillic property of phosphonium.

SUMMARY OF THE INVENTION

The present invention provides a cationic resin which can produce a pigment paste having high dispersion stability, an electrodeposition paint with good storage stability and a coated film with preferred corrosion resistance.

The present invention provides a cationic pigment grinding resin for electrodeposition paint obtained by reacting
a) a hydrophobic epoxy resin obtained by reaction of a bisphenol A type epoxy resin with a half-blocked isocyanate; with b) sulfide; which contains, in one molecule, at least one group represented by the formula,

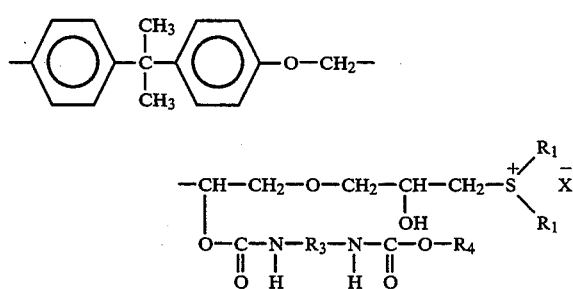

wherein $R_1$ stands for an alkyl or an alkanol group having $C_2$ to $C_{12}$, X stands for a residue of an organic acid or inorganic acid, $R_3$ stands for an aliphatic, alicyclic or aromatic alkylene group and $R_4$ stands for an alkyl group or alkyl ether group of $C_4$ to $C_{20}$,
in which said bisphenol A type epoxy resin has an epoxy equivalent of 180 to 1,000, said hydrophobic epoxy resin has a solubility parameter (hereinafter referred to as "SP value") of 10.0 to 11.0 and a conversion rate to tertiary sulfonium is 70 to 90%.

DETAILED DESCRIPTION OF THE INVENTION

The cationic resin is preferably manufactured by a method which includes a process to provide a hydrophobic epoxy resin having an SP value of 10.0 to 11.0 by reacting a bisphenol A type epoxy resin having an epoxy equivalent of 180 to 1,000 with a half-blocked isocyanate; and (ii) a step to react the hydrophobic epoxy resin with sulfide at an amount of 2.1 to 4.0 equivalent based on the epoxy group.

The epoxy resin used in the present invention generally is a polyepoxide. The polyepoxide has an average 1,2-epoxy group of at least one in one molecule. It is preferred that the polyepoxide has an epoxy equivalent of 180 to 1,000, preferably 375 to 800. When epoxy equivalent is less than 180, it is impossible to produce film at the time of electrodeposition and no film is obtained. When it is over 1,000, an amount of cationic base per molecule becomes insufficient and provides poor water solubility.

The useful polyepoxide may be polyglycidyl ether of polyphenol (for example, bisphenol A). It is prepared, for instance by etherifying the polyphenol with epichlorohydrin or dichlorhydrin in the presence of alkali. The polyphenol may be bis(4-hydroxyphenyl)-2,2-propane, 4,4'-dihydroxybenzophenone, bis(4-hydroxyphenyl)-1,1-ethane or its analogue.

The half-blocked isocyanate used for the reaction with the epoxy resin in the present invention may be prepared by partially blocking an organic polyisocyanate. It is desirable that the reaction between the organic polyisocyanate and the blocking agent is conducted by droping the blocking agent at a temperature of 40° to 50° C. with mixing, optionally in the presence of a tin catalyst. A reaction ratio of the organic polyisocyanate and the blocking agent may be determined according to stoichiometric calculation in the manner that the unblocked isocyanate group in one molecule of the produced half-blocked isocyanate is controlled to 1.0 to 0.5 mol equivalent, preferably 0.99 to 0.80 mol equivalent. When the amount of unblocked isocyanate group exceeds 1.0 mol equivalent, there is possibility of gelation at the time of the reaction with the epoxy resin. When the amount is less than 0.5 mol equivalent, the amount of full-blocked polyisocyanate which has not reacted with the epoxy resin increases and reduces water solubility.

The suitable organic polyisocyanate is not specifically limited as long as it has by average more than two isocyanate groups in one molecule. Typical examples of the polyisocyanates are aliphatic polyisocyanates, such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidine diisocyanate and butylidene diisocyanate; cycloalkylene diisocyanates, such as 1,3-cyclopentane diisocyanate, 1,4-cyclohexane dissocyanate and 1,2-cyclohexane diisocyanate; aromatic diisocyanates, such as m-phenylene diisocyanate, p-phenylene diisocyanate, p-phenylene diisocyanate, 4,4'-diphenyl diisocyanate, 1,5-naphthalene diisocyanate and 1,4-naphthalene diisocyanate; aliphatic-aromatic diisocyanates, such as 4,4-diphenylenemethane diisocyanate, 2,4- or 2,6-tolylene diisocyanate or a mixture thereof, 4,4'-toluidine diisocyanate and 1,4-xylylene diisocyanate; nuclear substituted aromatic diisocyanates, such as dianisidine isocyanate, 4,4'-diphenyl ether diisocyanate and chlorodiphenylene diisocyanate; triisocyanates, such as triphenylmethane —4,4',4''-triisocyanate, 1,3,5-triisocyanate benzene and 2,4,6-triisocyanate toluene; tetraisocyanates, such as 4,4'-diphenyldimethylmethane-2,2', 5,5'-tetraisocyanate; polymeric polyisocyanates, such as tolylene dissocyanate dimer and trimer, etc.

The polyisocyanate used in the present invention is preferred to have isocyanate group having various reactivity to facilitate the blocking reaction.

Suitable blocking agent for preparation of the half-blocked isocyanate is a lower aliphatic alkyl monoalcohol having 4 to 20 carbon atoms. When carbon atom number contained in the blocking agent is below 4, appropriate SP value is not obtained and when it exceeds 20, appropriate conversion rate to tertiary sulfonium is not obtained. Concrete examples of the blocking agents are lower aliphatic alcohols, such as butyl alcohol, amyl alcohol, hexyl alcohol, 2-ethylhexyl alcohol, heptyl alcohol, octyl alcohol, nonyl alcohol, 3,3,5-trimethyl hexanol, decyl alcohol, lauryl alcohol and stearyl alcohol.

The hydrophobic epoxy resin is obtained by reacting the epoxy resin with the half-blocked isocyanate. The reaction is preferably conducted by holding the reaction mixture at 140° C. for about one hour. The reaction rate of epoxy resin: half-blocked isocyanate is preferred to be 1:1 to 1:2. The reaction is continued until absorption of isocyanate group substantially disappears by IR spectrum.

In the reaction, epoxy resin obtains hydrophobic property through reacting the hydroxy group contained in the epoxy resin with the unblocked isocyanate group in the half-blocked isocyanate. Thereby the pigment paste employing the cationic resin thus obtained as grinding agent gains dispersion stability. The hydrophobic epoxy resin preferably has an SP value of 10.0 to 11.0, more preferably 10.2 to 10.6. The SP value is an index to show polarity of resin and may be measured for example by using a turbidity method to use, for example, water and hexane titration. When the SP value of hydrophobic epoxy resin exceeds 11.0, hydrophobic property of the resin decreases and the mutual reaction between the resin and the pigment decreases and dispersion stability of the pigment paste becomes insufficient, while if it becomes less than 10.0, hydrophillic property of the resin decreases and the storage stability of the aqueous electrodeposition paint becomes inferior. The SP value of hydrophobic epoxy resin may be adjusted by the reaction rate of the half-blocked isocyanate and through appropriate selection of $R_3$ and $R_4$.

By introducing an onium group into the hydrophobic epoxy resin, the resin is given hydrophillic property. Through the process, it is possible to obtain an electrodeposition paint which indicates dispersibility and storage stability when pigment paste is diluted with an aqueous medium. According to the present invention, it is preferred to introduce sulfonium group by reacting epoxy group present in the hydrophobic epoxy resin and sulfide. The reaction is conducted by mixing and stirring the hydrophobic epoxy resin, a sulfide-acid mixture and deionized water under a reaction temperature of 70° to 75° C.

Generally in the case of the half-blocked hydrophobic epoxy resin as stated above, the added half-blocked isocyanate becomes steric hindrance and the reactivity of epoxy group and sulfide is low. As the result, it is impossible to obtain a cationic resin having sufficient conversion ratio to tertiary sulfonium (over 70%). As the result, hydration stability of the obtained cationic resin is low and the storage stability of electrodeposition paint after dilution is inferior.

Therefore, it is preferred to raise the conversion ratio to tertiary sulfonium over 70% through improvement of a reaction ratio of epoxy group and sulfide. In the present invention, it has been found that the reaction ratio of epoxy group and sulfide is over 70% by reacting the expoxy resin with sulfide in an amount such that excess sulfide is reacted based on an epoxy group, for example at 2.1 to 4 equivalent per one epoxy group.

By the "conversion ratio to tertiary sulfonium" is meant a conversion ratio of the epoxy groups to tertiary sulfonium groups per one molecule by the reaction of the epoxy group and the sulfide and can be calculated by the following formula.

{(actually measured value of base equivalent)/(theoretical base equivalent in case when all epoxy groups are made tertiary)} × 100 (%).

The sulfide to be preferably used here is any sulfide which reacts with epoxy group and contains no hindrance group. For instance, it may be aliphatic sulfide, aliphatic-aromatic mixed sulfide, aralkyl sulfide or cyclic sulfide, Examples of the sulfides may be diethyl sulfide, dipropyl sulfide, dibutyl sulfide, diphenyl sulfide, dihexyl sulfide, ethylphenyl sulfide, tetramethylene sulfide, pentamethylene sulfide, thiodiethanol, thiodipropanol and thiodibutanol, etc. Preferably the sulfide should have the chemical structure represented by the formula,

R—S—R (wherein R is an alkyl group or a hydroxyalkyl group containing 2 to 12 carbon atoms). Most preferably the sulfide is thiodiethanol.

Acid preferably used here is an organic or inorganic acid which forms quaternary sulfonium salt. Preferably, it is organic carboxylic acid, preferably represented by R$_2$—COO⁻ wherein R$_2$ represents an alkanol group of C$_1$ to C$_5$. Concrete examples of the acids are boric acid, formic acid, lactic acid, propionic acid, butyric acid, dimethylpropionic acid, hydrochloric acid, phosphoric acid and sulfuric acid. Dimethylol propionic acid is preferred.

Using thus obtained cationic resin and the pigment, it is possible to prepare the pigment paste for electrodeposition paint, employing the method well-known to the industry. A weight ratio of the cationic resin: the pigment may be within the range of 1:1 to 1:10.

The pigment preferably used here is not specifically limited as long as it is used for electrodeposition paint. Typical examples of the pigments are strontium chromate, carbon black, titanium dioxide, talc, barium sulfate, cadmium yellow, cadmium red, chromic yellow, aluminum phosphorus molybdate, zinc phosphorus molybdete and their combinations.

The electrodeposition paint is obtained by mixing the pigment paste with deionized water and cationic resin and by further adding, as auxiliary agents, additives as are well known to the industry such as resin, solvent, antioxidant, surfactant and other auxiliary agents typically used in the electrodeposition process, In the process, a formulating ratio of pigment may be freely selected in the range of 10 to 50 wt % based on the total solid content of the paint. If the content of pigment exceeds 50%, smoothness of the paint film and therefore the appearance of the paint film is inferior, while if it is less than 10%, the corrosion resistant effect and crater prevention effect are inferior and it is undesirable.

An amount of the pigment paste in the electrodeposition paint is not limited, but generally within the range of 10 to 50% by weight, based on the solid content of the electrodeposition paint.

EXAMPLES

Preparation Example 1

Preparation of polyurethane crosslinking agent.

A reaction vessel was charged with 199.1 part of hexamethylene diisocyanurate (hereinafter abbreviated as HDI-nurate), and diluted with 31.6 part of methyl isobutyl ketone (hereinafter abbreviated as MIBK). Subsequently 0.2 part of dibutyltin laurate was added and, after increasing a temperature of the reaction mixture to 50° C., 87 parts of methyl ethyl ketoxime (hereinafter abbreviated as MEK oxime) was added in dry nitrogen atmosphere under agitation and it was cooled to keep at a reaction temperature of 50° C.

The reaction mixture was held at 70° C. for one hour until substantial disappearance of the absorption of isocyanate group was confirmed by infrared absorption spectrum and subsequently the reaction product was diluted with 35.8 parts of MIBK, and 4.0 parts of n-butanol (solid resin content 80.0%).

Preparation Example 2

Preparation of polycaprolacton diol chain extention polyether.

A reaction vessel equipped with a stirrer, a condenser a nitrogen gas introducing tube and a thermometer, was charged with 99.8 parts of EPIKOTE 1001 ( bisphenol A type epoxy resin manufactured by Yuka-Shell Epoxy Co.), 850.2 parts of EPIKOTE 1004 (bisphenol A type epoxy resin manufactured by Yuka-Shell Epoxy Co.), 55 parts of nonyl phenol and 193.3 parts of MIBK (methyl isobutyl ketone), and reacted at 140° C. for 4 hours in the presence of 4.5 parts of benzyldimethylamine to obtain a product having an epoxy equivalent of 1175.

Thereafter, 69.1 parts of ethyleneglycol n-hexyl ether, 35.4 parts of a MIBK solution (solid content=78%) of a MIBK ketimine of 2-aminoethanolamine, 26.5 parts of N-methylethanolamine and 37.1 parts of diethanolamine were added and heated to 120° C., followed by reacting for 2 hours to obtain a resin vernish.

EXAMPLE 1

A reaction vessel was charged with 222.2 parts of isophorone diisocyanate (hereinafter abbreviated as IPDI) and diluted with 39.1 parts of methyl isobutyl ketone and subsequently 0.2 part of dibutyltin dilaurate. After raising a temperature to 50° C., 131.5 parts of 2-ethylhexanol (hereinafter abbreviated as 2EH) was dropped in dry nitrogen atmosphere under agitation for 2 hrs. to cause reaction. By appropriate cooling, the reaction temperature was held at 50° C. As the result, a 2-ethylhexanol-half blocked IPDI was obtained ( solid content was 90% ).

Subsequently, EPON 828 (epoxy resin manufactured by Shell Chemical Co.) and bis-phenol A were charged in an appropriate vessel as per the composition indicated in the Table below, the mixture was heated to 130° C. in nitrogen atmosphere and benzyldimethylamine was added thereto. It was reacted for about one hour at 170° C. in exothermic reaction, thus obtaining bisphenol A type epoxy resin having epoxy equivalent of 411. Next, the reaction mixture was cooled to 140° C. and the 2-ethylhexanol-half blocked IPDI was added thereto. The mixture was held at 140° C. for about one hour to continue the reaction, thus obtaining hydrophobic epoxy resin having SP value of 10.6. After diluting it by addition of 255.6 parts of dipropyleneglycol monobutyl ether, the reaction mixture was cooled to 100° C. at which 1-(2-hydroxyethylthio)2,3-propane diol, tartaric acid, dimethylol propionate and deionized water were added.

The mixture was caused to react at 70° to 75° C. until an acid value of 8.0 was reached, thus obtaining a pigment grinding cationic resin with tertiary sulfonium conversion rate of 89%. Subsequently it was diluted with 221.5 parts of DPNB to make it into a varnish A for pigment dispersion (solid resin content was 50%).

| Components | Weight parts | Solid content |
| --- | --- | --- |
| EPON 828 | 376.0 | 376.0 |
| Bisphenol A | 96.9 | 96.9 |
| Benzyldimethylamine | 0.75 | — |
| 2-Ethylhexanol half-blocked IPDI (in MIBK) | 228.3 | 205.5 |
| DPNB | 255.6 | — |
| 1-(2-Hydroxyethylthio)-2,3-propane diol | 366.0 | 122.0 |
| Tartaric acid | 15.0 | 15.0 |
| Dimethylol propionate | 140.7 | 140.7 |
| Deionized water | 144.0 | — |
| DPNB | 221.5 | — |

Table 1 shows an epoxy equivalent of bisphenol A type epoxy resin, kind of half-blocked isocyanate, mol number of half-blocked polyisocyanate added to one molecule of epoxy resin, sulfide equivalent for the epoxy group, SP value of hydrophobic epoxy resin and tirtiary sulfonium rate of the obtained cationic resin, together with the results obtained in Examples 2 to 4 and Comparative Examples 1 to 4.

EXAMPLE 2

174.0 parts of tolylene diisocyanate (TDI) was used instead of 222.0 parts of IPDI and the amount of MIBK was changed from 33.1 parts to 33.9 parts, while the rest of the process was conducted in the same manner as in Example 1, thus obtaining 2-ethylhexanol half-blocked TDI (solid content was 95%).

| Component | Weight parts | Content content |
|---|---|---|
| EPON 828 | 376. | 376.0 |
| Bisphenol A | 114.0 | 114.0 |
| Benzyldimethylamine | 0.75 | — |
| 2-Ethylhexanol half-blocked TDI (in MIBK) | 317.0 | 301.1 |
| Ethylene glycol monobutyl ether | 199.3 | — |
| Thiodiethanol | 366.0 | 122.0 |
| Dimethylolpropionic acid | 134.0 | 134.0 |
| Deionized water | 144.1 | — |
| Ethylene glycol monobutyl ether | 433.1 | — |

A pigment grinding cationic resin was obtained by causing reaction with the above composition under the same reaction conditions as in Example 1 and it was made into varnish B used for grinding pigment (solid resin content was 50%).

EXAMPLE 3

Amount of MIBK was changed from 39.1 parts to 45.5 parts and 188,2 parts of lauryl alcohol was used instead of 131.5 parts of 2-ethyl hexanol, while the rest of the process was conducted in the same manner as in Example 1, thus obtaining lauryl alcohol half-blocked IPDI (solid content was 90%).

| Components | Weight parts | Solid content |
|---|---|---|
| EPON 828 | 376.0 | 376.0 |
| Bisphenol A | 114.0 | 114.0 |
| Benzyldimethylamine | 0.75 | — |
| Lauryl alcohol half-blocked IPDI | 340.0 | 306.2 |
| Ethylene glycol monobutyl ether | 177.1 | — |
| Thiodiethanol | 488.0 | 122.0 |
| Dimethylolpropionic acid | 134.0 | 134.0 |
| Deionized water | 144.0 | — |
| Ethylene glycol monobutyl ether | 330.3 | — |

A pigment grinding cationic resin was obtained by causing reaction with the above composition under the same reaction conditions as in Example 1 and it was made into varnish C used for dispersion of pigment (solid resin content was 50% ).

EXAMPLE 4

| Components | Weight parts | Solid content |
|---|---|---|
| EPON 828 | 564.0 | 564.0 |
| Bisphenol A | 228.0 | 228.0 |
| Benzyldimethylamine | 1.12 | — |
| 2-Ethylhexanol half-blocked TDI | 166.7 | 158.3 |
| Ethylene glycol monobutyl ether | 250.8 | — |
| Thiodiethanol | 488.0 | 122.0 |
| Dimethylolpropionic acid | 134.0 | 134.0 |
| Deionized water | 144.0 | — |
| Ethylene glycol monobutyl ether | 436.0 | — |

A pigment grinding cationic resin was obtained by causing reaction according to the above composition under the same conditions as in Example 1 and it was made into varnish D used for grinding pigment (solid resin content was 50%).

Comparative Example 1

Resin described on Japanese Kokai Patent Sho 62-165116 was prepared.

| Composition | Weight parts | Solid content |
|---|---|---|
| EPON 828 | 533.2 | 533.2 |
| Bisphenol A | 199.6 | 199.6 |
| Nonylphenol | 19.2 | 19.2 |
| Benzyldimethylamine | 0.75 | — |
| Propylene glycol monobutyl ether | 201.6 | — |
| Thiodiethanol | 122.1 | 122.1 |
| Dimethylolpropionic acid | 134.1 | 134.1 |
| Deionized water | 30.6 | — |

EPON 828, bisphenol A and nonylphenol were put into a reaction vessel, the mixture was heated to 107° C. and the temperature was held at this level until bisphenol A dissolves. Subsequently, ethyltriphenyl phosphonium iodide was added and the mixture was heated to 125° C. to induce generation of heat. The mixture was held at the exothermic state for about one hour until the epoxy equivalent of 763 was reached. The reaction mixture was cooled to 75° C. and propylene glycol monobutyl ether, thiodiethanol, dimethylol propionic acid and deionized water were added. Thereafter, the reaction product was heated to 70° to 75° C. until acid value reached 3.2 and thus cationic resin for dispersion of pigment was obtained. The reaction product was cooled and it was diluted with water until solid content became 30% and it was made into varnish E used for grinding pigment.

Comparative Example 2

| Components | Weight parts | Solid content |
|---|---|---|
| EPON 828 | 376.0 | 376.0 |
| Bisphenol A | 114.0 | 114.0 |
| Benzyldimethylamine | 0.75 | — |
| 2-Ethylhexanol half-blocked TDI (in MIBK) | 166.7 | 158.3 |
| Ethylene glycol monobutyl ether | 168.4 | — |
| Thiodiethanol | 122.0 | 122.0 |
| Dimethylolpropionic acid | 134.0 | 134.0 |
| Deionized water | 144.0 | — |
| Ethylene glycol monobutyl ether | 582.5 | — |

A cationic resin for grinding pigment was obtained by causing reaction under the same conditions as in Example 1 and it was made into varnish F used for grinding pigment (solid resin content was 50%).

Comparative Example 3

The resin described in Japanese Kokai Patent Sho 53-47143 and Sho 56-2089 were prepared.

| Components | Weight parts | Solid content |
|---|---|---|
| EPON 828 | 376.0 | 376.0 |
| Bisphenol A | 114.0 | 114.0 |
| Benzyldimethylamine | 0.75 | — |
| 2-Ethylhexanol half-blocked TDI | 166.7 | 158.3 |
| Ethylene glycol monobutyl ether | 168.4 | — |
| Thiodiethanol | 244.0 | 122.0 |
| Dimethylol propionic acid | 134.0 | 134.0 |
| Deionized water | 144.0 | — |
| Ethylene glycol monobutyl ether | 460.7 | — |

A cationic resin for grinding pigment was obtained by causing reaction with the above composition under the same reaction conditions as in Example 1 (solid resin content was 50%).

Comparative Example 4

The resin described in Japanese Kokai Patent 54-4978 was prepared.

| Components | Weight parts | Solid content |
|---|---|---|
| 2-Ethylhexanol half-blocked TDI (in MIBK) | 320.0 | 304 |
| Dimethylethanolamine | 87.2 | 87.2 |
| Aqueous solution of lactic acid | 117.6 | 88.2 |
| Ethylene glycol monobutyl ether | 39.2 | — |

2-Ethylhexanol half-blocked TDI was added to dimethylethanolamine at room temperature with the above composition using proper reaction vessel. The mixture having generated heat was stirred for one hour at 80° C. Subsequently lactic acid was charged and further butyl cellosolve was added. The reaction mixture was again stirred for about half an hour at 65° C. to obtain quaternarization agent.

| Components | Weight parts | Solid content |
|---|---|---|
| EPON 829 | 710.0 | 681.2 |
| Bisphenol A | 289.6 | 289.6 |
| 2-Ethylhexanol half-blocked TDI (in MIBK) | 406.4 | 386.1 |
| Quaternarization agent of 1) | 496.3 | 421.9 |
| Deionized water | 71.2 | |
| Ethylene glycol monobutyl ether | 56.76 | |

1) Bis-phenol type epoxy resin, epoxy equivalent 193–203, manufactured by Shell Chemical Co.

EPON 829 and bisphenol A were charged in an appropriate reaction vessel using the above composition and it was heated to 150° to 160° C. in nitrogen atmosphere. Initial exothermic reaction occurred. The reaction mixture was caused to react for about one hour at 150° to 160° C. and subsequently, it was cooled to 120° C. and 2-ethylhexanol half-blocked TDI was added. The reaction mixture was held for about one hour at 110° to 120° C. and subsequently butyl cellosolve was added. Subsequently, it was cooled to 85° to 9° C., made uniform and then quaternarization agent of 1) was added. The reaction mixture was held at 80° to 85° C. until acid value became 1 and the varnish H for grinding pigment was obtained.

TABLE 1

| | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| Equivalent of starting epoxy resin | 490 | 490 | 490 | 792 | 652 | 490 | 490 | 792 |
| Name of half-blocked isocyanate | IPDI-2EH*[1] | TDI-2EH | IPDI-LA*[2] | TDI-2EH | Nothing | TDI-2EH | TDI-2EH | TDI-2EH |
| Mol number of added blocking agent in one molecule | 1.0 | 2.0 | 1.5 | 1.0 | — | 1.0 | 1.0 | 1.0 |
| Equivalent of sulfide per one epoxy group | 3.0 | 3.0 | 4.0 | 4.0 | 1.0 | 1.0 | 2.0 | Quaternay ammonium |
| SP value of hydrophobic epoxy resin | 10.6 | 10.3 | 10.5 | 10.2 | 11.4 | 10.5 | 10.5 | — |
| Conversion rate to tertiary sulfonium | 82% | 70% | 75% | 78% | 55% | 35% | 65% | — |

*[1] 2-Ethylhexyl alcohol
*[2] Lauryl alcohol

Examples 5 * 8 indicate the preparation of various pigment dispersed pastes using the varnish for grinding paste obtained in Example 1 * 4.

EXAMPLE 5

The mixture of components described below was dispersed by a sand grind mill and mealed to the grain diameter less than 10$\mu$, to obtain a pigment paste.

| Components | Weight parts |
|---|---|
| Varnish A for grinding pigment (Example 1) | 30.0 (solid content = 15 parts) |
| Deionized water | 75.4 |
| Carbon black | 1.8 |
| Kaolin | 20.0 |
| Lead silicate | 6.0 |
| Titanium dioxide | 72.2 |

A pigment paste had total solid of 56.0%, solid resin content of 7.3%, solid pigment content of 48.7%. After leaving it and standing for 2 weeks at 40° C., state of sedimentation of the paste was checked and thereby the dispersion stability of the pigment dispersed paste was evaluated.

The results of evaluation are shown in Table 2 together with the results obtained in Examples 6 to 8 and Comparative Examples 5 to 8.

EXAMPLE 6

The varnish for grinding pigment of Example 2 was used instead of the varnish for grinding pigment of Example 1, 20.0 parts of phosphomolibdenate was used instead of 20.0 parts of Kaolin, while the rest of the process was conducted in the same manner as in Example 5 to prepare the pigment dispersed paste.

EXAMPLE 7

The varnish for grinding pigment of Example 3 was used instead of the varnish for grinding pigment of Example 1, while the rest of the process was conducted in the same manner as in Example 5, to prepare the pigment dispersed paste.

EXAMPLE 8

The varnish for grinding pigment of Example 4 was used instead of the varnish for grinding pigment of Example 1, while the rest of the process was conducted in the same manner as in Example 5, to prepare the pigment dispersed paste.

Comparative examples 5 to 8 describe the preparation of various pigment dispersed pastes which use the varnish for grinding pigment of Comparative Examples 1 to 3.

Comparative Example 5

50.0 weight parts (solid content 15.0 parts) of the varnish for grinding pigment of Comparative Example 1 was used instead of the varnish for grinding pigment of Example 1 together with 41.7 weight parts of deionized water, while the rest of the process was conducted in the same manner as in Example 5 to prepare the pigment dispersed paste (total solid content was 60.0%).

Comparative Example 6

The varnish for grinding pigment of Comparative Example 2 was used instead of the varnish for grinding pigment of Example 1 while the rest of the process was conducted in the same manner as in Example 5 to prepare the pigment dispersed paste.

Comparative Example 7

The varnish for grinding pigment of Comparative Example 3 was used instead of the vanish for grinding pigment of Example 1, while the rest of the process was conducted in the same manner as in Example 5 to prepare the pigment dispersed paste.

Comparative Example 8

The varnish for grinding pigment of Example 4 was used instead of the varnish for pispersing pigment of Example 1, while the rest of the process was conducted in the same manner as in Example 5 to prepare the pigment dispersed paste.

TABLE 2

| Example No. | Pigment dispersed vanish used | Result of evaluation of pigment paste[1] |
| --- | --- | --- |
| Example 5 | A | No sedimentation |
| Example 6 | B | No sedimentation |
| Example 7 | C | No sedimentation |
| Example 8 | D | No sedimentation |
| Comp. Ex 5 | E | Sever sedimentation |
| Comp. Ex. 6 | F | Slight sedimentation |
| Comp. Ex. 7 | G | No sedimentation |
| Comp. Ex. 8 | H | No sedimentation |

[1]After leaving it standing for 2 weeks at 40° C., the state of sedimentation of the paste was evaluated by visual check according to the following evaluation standard.

Examples 9 to 12 describe the method of preparation of various cationic electrodeposition paints which use pigment dispersed pastes of Examples 5 to 8.

EXAMPLE 9

| Components | Weight parts |
| --- | --- |
| Polycaprolactondiol chain extended polyether (Example of Preparation 2) | 576.0 |
| Polyurethane bridging agent (Example of preparation 1) | 331.9 |
| n-Hexyl cellosolve | 30.3 |
| Glacial acetic acid | 12.3 |
| Deionized water | 1420.1 |
| Pigment dispersed paste of Example 5 | 546.8 |
| Deionized water | 2670.0 |

Polycaprolactondiol chain extended polyester obtained in Example of Preparation 2 and polyurethane bridging agent obtained in Example of Preparation 1 were mixed with n-hexylcellosolve neutralized by glacial acetic acid and slowly diluted by deionized water. Subsequently organic solvent was removed under reduced pressure until solid content became 36.0%. Pigment dispersed paste was added thereto, mixed uniformly, the remaining deionized water was added to obtain a cationic electrodeposition paint A with solid content of 20.0%. Under agitation, it was stored for 4 weeks at 40° C. and then filtered by 380° C. mesh filter and the amount through the filter and the amount of residue were evaluated, to obtain the time stability of cationic electrodeposition paint A.

Subsequently thus obtained electrodeposition paint A was coated for the thickness of $10\mu$ on a cold-rolled steel sheet (without zinc phosphoric acid treatment) by electrodeposition and after baking it for 10 min. at 160° C., cross-cut was made into the paint film and the specimen was immersed for 120 hrs. by salt water spray test (SST). An adhesive tape of 2.4 cm in width (manufactured by Nichiban Corp., tradename "Cellotape") was applied securely on the specimen by finger and the tape was quickly peeled off. By measuring the width of peeling of paint film from the steel sheet, the salt water corrosion resistance of electrodeposition paint A was evaluated.

Table 3 shows the results of the evaluation, together with the results obtained in Examples 10 to 12 and comparative Examples 9 to 12 described below.

EXAMPLE 10

Pigment dispersed paste of Example 6 was used instead of pigment dispersed paste of Example 5, while the rest of the process was conducted in the same way as in Example 9 to obtain the cationic electrodeposition paint B.

EXAMPLE 11

Pigment dispersed paste of Example 7 was used instead of pigment dispersed paste of Example 5, while the rest of the process was conducted in the same way as in Example 9 to obtain the cationic electrodeposition paint.

EXAMPLE 12

Pigment dispersed paste of Example 8 was used instead of pigment dispersed paste of Example 5, while the rest of the process was conducted in the same way as in Example 9 to obtain the cationic electrodeposition paint D.

The Comparative Example 9 to 11 given below introduce the methods of preparation of various cationic electrodeposition paints which use pigment dispersed paste of Comparative Examples 5–8.

Comparative Example 9

509.7 parts of the pigment dispersed paste of Comparative Example 5 and 2702.7 parts of deionized water were used instead of the pigment dispersed paste of Example 5, while the rest of the process was conducted in the same way as in Example 9 to obtain the cationic electrodeposition paint E.

Comparative Example 10

Pigment paste of Comparative Example 6 was used instead of pigment paste of Example 5, while the rest of the process was conducted in the same way as in Example 9 to obtain the cationic electrodeposition paint F.

Comparative Example 11

Pigment paste of Comparative Example 7 was used instead of the pigment paste of Example 5, while the rest of the process was conducted in the same way as in Example 9 to obtain the cationic electrodeposition paint G.

Comparative Example 12

Pigment paste of Comparative Example 8 was used instead of pigment paste of Example 5, while the rest of the process was conducted in the same way as in Example 9 to obtain the cationic electrodeposition paint H.

TABLE 3

|  | Pigment grinding varnish | Strage stability*1 | Corrosion resinstance to salty water |
| --- | --- | --- | --- |
| Example 9 | A | Good (7 mg) | Less than 2 mm |
| Example 10 | B | Good (22 mg) | Less than 2 mm |
| Example 11 | C | Good (4 mg) | Less than 2 mm |
| Example 12 | D | Good (30 mg) | Less than 2 mm |
| Comp. Ex. 9 | E | Fairly good (over 100 mg) | Less than 2 mm |
| Comp. Ex. 10 | F | Poor | Not measured |
| Comp. Ex. 11 | G | Fairly good (54 mg) | Less than 2 mm |
| Comp. Ex. 12 | H | Good (18 mg) | More than 3 mm |

[1]The amount having passed through a 380 mesh filter and the amount of residue measured with the electrodeposition paint having been stored for 4 weeks at 40° C. under stirring. Storage stability of the paint was evaluated by the following standard. The figures in the parenthesis indicate the amount of residue after filtration. Good: passes easily, Fairly good: hard to pass through, Poor: cloggs filter
[2]Evaluation standard of corrosion resistance against salt water, expressed by peeling width.

The cationic resin which can produce pigment paste with preferred dispersion stability, electrodeposition paint with preferred storage stability and the paint film with preferred corrosion resistance has been provided.

What is claimed is:

1. A cationic pigment grinding resin for electrodeposition paint obtained by reacting a) a hydrophobic epoxy resin obtained by reaction of a bisphenol A epoxy resin with a half-blocked isocyanate; with b) sulfide; which contains, in one molecule, at least one group represented by the formula,

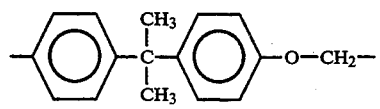

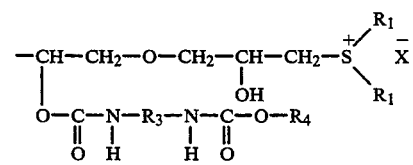

wherein $R_1$ stands for an alkyl or an alkanol group having $C_2$ to $C_{12}$, X stands for a residue of an organic acid or inorganic acid, $R_3$ stands for an aliphatic, alicyclic or aromatic alkylene group and $R_4$ stands for an alkyl group or alkyl ether group of $C_4$ to $C_{20}$, in which said bisphenol A epoxy resin has an epoxy equivalent of 180 to 1,000, said hydrophobic epoxy resin has a solubility parameter of 10.0 to 11.0 and the conversion ratio to tertiary sulfonium is 70 to 90%.

2. The cationic pigment grinding resin according to claim 1 wherein in the formula, X stands for $R_2$—COO— wherein $R_2$ represents an alkanol group of $C_1$ to $C_5$.

3. The cationic pigment grinding resin according to claim 1 wherein said polyepoxide has an epoxy equivalent of 180 to 1,000.

4. The cationic pigment grinding resin according to claim 1 wherein said polyepoxide is a polyglycidyl ether of bisphenol A.

5. The cationic pigment grinding resin according to claim 1 wherein said half-blocked isocyanate is prepared by partically blocking an organic polyisocyanate with a blocking agent.

6. The cationic pigment grinding resin according to claim 5 wherein said organic polyisocyanate is selected from the group consisting of trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidine diisocyanate, butylidene diisocyanate, 1,3-cyclopentane diisocyanate, 1,4-cyclohexane dissocyanate, 1,2-cyclohexane diisocyanate, m-phenylene diisocyanate, p-phenylene diisocyanate, p-phenylene diisocyanate, 4,4'-diphenyl diisocyanate, 1,5-naphthalene diisocyanate, 1,4-naphthalene diisocyanate, 4,4-diphenylenemethane diisocyanate, 2,4- or 2,6-tolylene diisocyanate or a mixture thereof, 4,4'-toluidine diisocyanate, 1,4-xylylene diisocyanate, dianisidine isocyanate, 4,4'-diphenyl ether diisocyanate, chlorodiphenylene diisocyanate, triphenylmethane-4,4',4"-triisocyanate, 1,3,5-triisocyanate benzene, 2,4,6-triisocyanate toluene, 4,4'-diphenyldimethylmethane-2,2',5,5'-tetraisocyanate and tolylene dissocyanate dimer and trimer.

7. The cationic pigment grinding resin according to claim 5 wherein said blocking agent is a lower aliphatic alkyl monoalcohol having 4 to 20 carbon atoms.

8. The cationic pigment grinding resin according to claim 1 wherein a reactant ratio of epoxy resin: half-blocked isocyanate is 1:1 to 1:2.

9. The cationic pigment grinding resin according to claim 1 wherein said hydrophobic epoxy resin has a solubility parameter value of 10.2 to 10.6.

10. The cationic pigment grinding resin according to claim 1 wherein said sulfide is represented by the formula:

R—S—R wherein R is an alkyl group or a hydroxyalkyl group containing 2 to 12 carbon atoms.

11. The cationic pigment grinding resin according to claim 10 wherein said sulfide is thiodiethanol.

12. Process for producing the cationic pigment grinding resin for electrodeposition paint according to claim 1 which comprises:
   i) a step to provide a hydrophobic epoxy resin with, solubility parameter value of 10.0 to 11.0 by reacting a bisphenol A epoxy resin with epoxy equivalent of 180 to 1,000 and a half-blocked isocyanate; and
   ii) a step to react the hydrophobic epoxy resin with sulfide such an amount that an equivalent of the sulfide is within the range of 2.1 to 4.0 based on one epoxy group.

13. A pigment paste comprising a pigment grinding resin according to claim 1 and a pigment wherein a weight ratio of pigment/pigment grinding resin is within the range of 1/1 to 1/10.

14. An electrodeposition paint comprising the pigment paste according to claim 13 and an electrodepositable film-forming resin in an aqueous medium, wherein the pigment paste contains in an amount of 10 to 50% by weight, based on the solid content of the electrodeposition paint.

* * * * *